US011739277B2

(12) United States Patent
Subramani et al.

(10) Patent No.: US 11,739,277 B2
(45) Date of Patent: Aug. 29, 2023

(54) PROCESS FOR REMOVAL OF SULFUR AND OTHER IMPURITIES FROM OLEFINIC LIQUEFIED PETROLEUM GAS

(71) Applicant: Indian Oil Corporation Limited, Mumbai (IN)

(72) Inventors: Saravanan Subramani, Haryana (IN); Vimal Kumar Upadhyay, Haryana (IN); Prosenjit Maji, Haryana (IN); Reshmi Manna, Haryana (IN); Vatsala Sugumaran, Haryana (IN); Mahalingam Vanamamalai, Haryana (IN); Madhusudan Sau, Haryana (IN); Gurpreet Singh Kapur, Haryana (IN); Sankara Sri Venkata Ramakumar, Haryana (IN)

(73) Assignee: Indian Oil Corporation Limited, Mumbai (IN)

( * ) Notice: Subject to any disclaimer, the term of this patent is extended or adjusted under 35 U.S.C. 154(b) by 0 days.

(21) Appl. No.: 17/204,732

(22) Filed: Mar. 17, 2021

(65) Prior Publication Data

US 2021/0292670 A1   Sep. 23, 2021

(30) Foreign Application Priority Data

Mar. 18, 2020   (IN) .............................. 202021011666

(51) Int. Cl.
*C10L 3/10* (2006.01)
*C10L 3/12* (2006.01)
(Continued)

(52) U.S. Cl.
CPC .................. *C10L 3/12* (2013.01); *B01D 3/14* (2013.01); *B01J 39/05* (2017.01); *B01J 39/19* (2017.01);
(Continued)

(58) Field of Classification Search
CPC ...... C10L 3/12; C10L 3/103; C10L 2290/141; B01D 3/14
See application file for complete search history.

(56) References Cited

U.S. PATENT DOCUMENTS 2,862,856 A    12/1958   Hunt
6,613,108 B1*  9/2003   Aittamaa .................. C07C 9/21
                                              585/521
(Continued)

FOREIGN PATENT DOCUMENTS

CN    103965984 A      8/2014
CN    106554839 A  *   4/2017
(Continued)

OTHER PUBLICATIONS

Machine Translation of CN106554839A (Year: 2017).*

*Primary Examiner* — Ellen M Mcavoy
*Assistant Examiner* — Ming Cheung Po
(74) *Attorney, Agent, or Firm* — Blank Rome LLP

(57) ABSTRACT

Organic sulfur compounds which are generally present in the crude oil undergoes various transformations while processing the crude oil in the secondary processing units such as fluid catalytic cracker, hydrocracker, delayed coker, visbreaker, etc. The sulfur present in the feed which enters into these secondary processing units are distributed into various products coming out of the units. Sulfur compounds which are present in the various product fractions are removed to meet the desired specifications before routing to the final product pool. Conventionally, sulfur present in the LPG has been removed by amine treatment followed by caustic and water wash. The present invention relates to a process for removal of sulfur and other impurities from Liquefied Petroleum Gas (LPG) comprising olefins through reactive desulfurization route. The present invention is an eco-friendly (Continued)

process as it minimizes or eliminates the use of caustic which is conventionally used to remove the sulfur from LPG.

14 Claims, 2 Drawing Sheets

(51) Int. Cl.
    *B01D 3/14*     (2006.01)
    *B01J 39/05*     (2017.01)
    *B01J 39/19*     (2017.01)

(52) U.S. Cl.
    CPC ......... *C10L 3/103* (2013.01); *C10L 2290/141* (2013.01); *C10L 2290/543* (2013.01); *C10L 2290/548* (2013.01)

(56) References Cited

U.S. PATENT DOCUMENTS 7,342,145 B2 * 3/2008 Wu .................. C10L 3/12
                                                 208/228
2002/0043154 A1 * 4/2002 Shore ............... C10L 3/12
                                                 95/135
2007/0241032 A1   10/2007  Picard et al.

FOREIGN PATENT DOCUMENTS

WO     WO-2007/023216 A1    3/2007
WO     WO-2019/118282 A1    6/2019

* cited by examiner

PROCESS FOR REMOVAL OF SULFUR AND OTHER IMPURITIES FROM OLEFINIC LIQUEFIED PETROLEUM GAS

FIELD OF THE INVENTION

This invention relates to the process for removal of sulfur and other impurities from olefinic Liquefied Petroleum Gas (LPG) comprising olefins through reactive desulfurization route.

BACKGROUND OF THE INVENTION

Organic sulfur compounds which are generally present in the crude oil undergoes various transformations while processing the crude oil in the secondary processing units such as fluid catalytic cracker, hydrocracker, delayed coker, visbreaker, etc. The sulfur present in the feed which enters into these secondary processing units are distributed into various products coming out of the units. The formation of sulfur species depends upon various parameters and the type of secondary processing units.

Sulfur compounds which are present in the various product fractions are removed to meet the desired specifications before routing to the final product pool. Conventionally, sulfur present in the LPG has been removed by amine treatment followed by caustic and water wash. $H_2S$ which is present in the LPG streams is removed by contacting the same with amine. Mercaptans are either removed or converted through sweetening process by converting to disulfides or removed by contacting with alkaline materials such as sodium hydroxide.

U.S. Pat. No. 2,862,856 discloses a process for purification of isobutylene by distilling the isobutylene in a distillation zone to separate an overhead product consisting essentially of the azeotrope of methyl mercaptan with isobutylene and a bottoms product consisting essentially of pure isobutylene, the improvement which comprises removing said azeotrope from the top of the distilling zone, forming two layers which comprises separating said azeotrope with a solution of caustic by reacting the mercaptan with the caustic to form a mercaptide which is immiscible with isobutylene and condensing, stratifying said two layers to give an upper layer of isobutylene and a lower layer comprising caustic and said mercaptide, and recycling said isobutylene layer to the distilling zone as reflux.

U.S. Pat. No. 7,342,145 discloses a process for removing sulfur-containing compound from liquefied petroleum gas (LPG) in a fixed bed reactor for adsorption of $H_2S$ using a catalyst comprising an active component selected from the group consisting of a Fe—Ca oxide and a Fe—Ca oxide hydrate for mercaptan conversion and by converting the mercaptans into disulfides by reacting with air and in presence of catalyst.

US20020043154A1 discloses a method to remove sulfur compounds from a gas having propylene upto 30 percent propylene using zeolite catalyst. The zeolite compound comprises less than 5 percent water. Useful zeolites include X, Y and faujasite. The zeolite can ion exchanged with ions such as zinc ion.

WO2007023216A1 relates to a method for the desulphurisation of olefinic gasolines, consisting of a sulphur compound weighting reaction comprising alkylation on the olefins in the feedstock, using an acid catalyst and comprising regeneration of the catalyst which may be performed sequentially or continuously. The process finds particular application in the treatment of conversion gasolines, and in particular gasoline produced by catalytic cracking, coking, visbreaking, or pyrolysis.

CN103965984A relates to a process for removing mercaptan in liquefied petroleum gas by subjecting the LPG stream to thioetherification reaction using a catalyst and further subjecting it to distillation.

CN106554839A relates to a process for removing hydrogen sulfide and mercaptan in liquefied petroleum gas using fixed bed reactors simultaneously.

WO2019118282A1 describes a process of an anionic exchange resin used for mercaptans removal. The method provides for passing a gas feedstream comprising mercaptans though a regenerable adsorbent media which adsorbs mercaptans to provide a mercaptan containing-lean gas product and a mercaptan-rich adsorbent media. The regenerable adsorbent media is a strongly basic ion exchange resin.

Therefore, there is a need for an eco-friendly process which minimizes or eliminates the use of caustic which has been conventionally required to remove the sulfur from LPG and allows use of spent catalyst from process units such as Methyl tert-butyl ether (MTBE), Ethyl tert-buty 1 ether (ETBE), tert-Amyl methyl ether (TAME), dimerization, etc. as reactive desulfurization catalyst.

OBJECTIVE OF THE PRESENT INVENTION

The primary objective of the present invention is to disclose a novel process for removal of sulfur and other impurities from LPG streams comprising olefins through reactive desulfurization route.

Another objective of the invention is to provide a process which subjects the LPG streams comprising olefins to amine treatment and treatment for removal of sulfur and other impurities such as nitrogenous compound and metals in a reactor comprising ion exchange resin catalyst.

Another objective of the disclosed invention is to minimize or avoid the significant generation of caustic waste from LPG treatment unit.

Another objective of the disclosed invention is to use the disposed off spent catalyst from process units such as MTBE, ETBE, TAME, dimerization, etc., as reactive desulfurization catalyst for this process.

SUMMARY OF THE INVENTION

In the petroleum refining and petrochemical industry, a lot of olefinic LPG streams comprising olefins are generated through various thermal and catalytic cracking processes such as delayed coking, steam cracking, fluid catalytic cracking (FCC), visbreaking, etc. The LPG streams which come from visbreaking, delayed coking and FCC units are contaminated with organic sulfur impurities. Conventionally, these streams are treated with amines for $H_2S$ removal through absorption followed by sweetening process which converts mercaptans present in the stream to disulfides, however the converted sulfides are not removed from the LPG streams. In some processes, after the amine treatment, the LPG streams are subjected to treatment with alkali solutions such as caustic where some mercaptans are removed, however the spent caustic generated in these processes are significant, which in turn causes environmental issues in the refinery.

In the present invention, LPG streams comprising olefins after amine treatment preferably isobutene are treated for removal of sulfur and other impurities such as nitrogenous compound and metals in a reactor comprising modified ion exchange resin catalyst. The present invention also discloses a novel process for removal of organic mercaptan sulfur from LPG streams after amine absorption through reactive desulfurization route.

The process reduces sulfur content to lower than 10 ppmw as compared to feed having sulfur content in a range of 30-900 ppmw.

Unlike conventional processes which require caustic consumption, the process of the present invention utilizes reactive desulfurization approach, which does not require caustic. Also, the process of present invention removes heavy sulfur from the feed, whereas in the conventional sweetening process, mercaptans are converted into sulfides and remain in the feed itself.

The spent ion exchange resin catalyst disposed from various process units such as MTBE, ETBE, TAME, dimerization, etc., can also be used as a desired catalyst for the process. Therefore, the problem of disposing the spent catalyst in landfill has also been resolved, which in turn makes this process environmentally benign by eliminating the solid as well as liquid effluent.

DETAILED DESCRIPTION OF THE INVENTION

Figure 1:
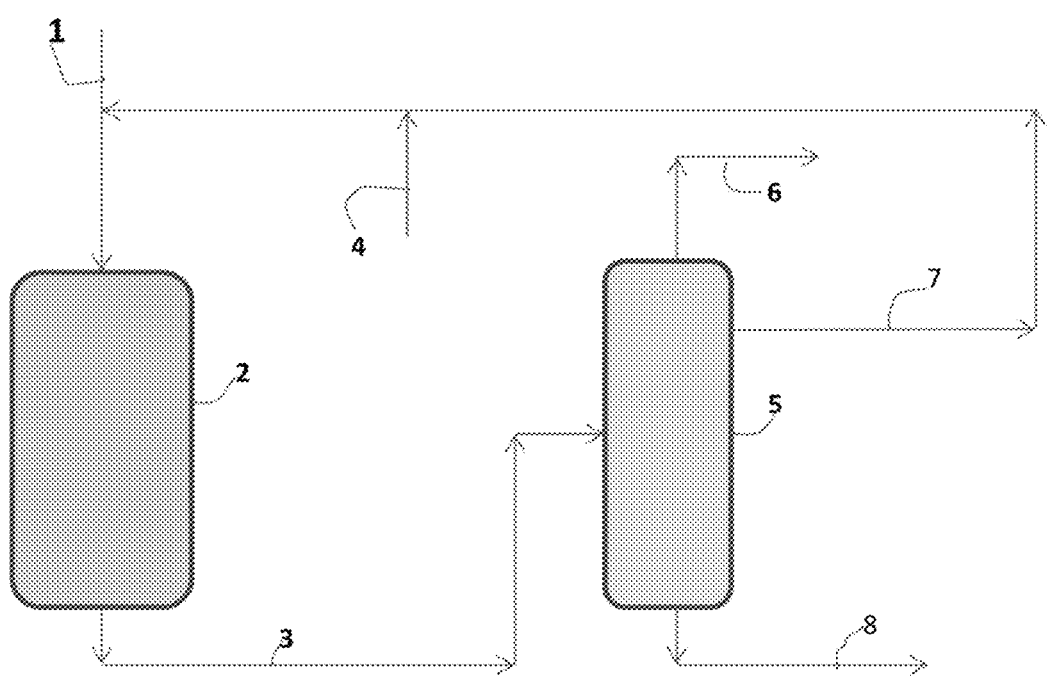
FIG. 1: is a diagrammatic representation of scheme 1 of the present invention.

Those skilled in the art will be aware that the present disclosure is subject to variations and modifications other than those specifically described. It is to be understood that the present disclosure includes all such variations and modifications. The disclosure also includes all such steps of the process, features of the product, referred to or indicated in this specification, individually or collectively, and any and all combinations of any or more of such steps or features.

The present disclosure is not to be limited in scope by the specific embodiments described herein, which are intended for the purposes of exemplification only. Functionally-equivalent products and methods are clearly within the scope of the disclosure, as described herein.

The LPG or C4 stream contains sulfide and mercaptan impurities such as hydrogen sulfide, carbonyl sulfide and various mercaptans. Conventionally, these impurities are removed by LPG treatment process with or without caustic regeneration. In both processes, hydrogen sulfide and carbonyl sulfide impurities are removed by treatment with amine solutions such as diethanolamine and methyldiethanolamine. Post hydrogen sulfide removal, mercaptans are removed by contacting with caustic solution followed by water wash. In the case of caustic wash without regeneration, LPG is contacted with caustic solution followed by water wash and moisture removal through salt dryer and then the treated LPG is routed to LPG pool or to different process units. Significant quantity of spent caustic and water is generated in this process which is normally routed to Effluent Treatment Plant, where additional chemicals are added to treat the spent caustic and water. In case of caustic with regeneration, mercaptans are removed in two steps. The first step involves contacting an LPG stream with the aqueous caustic solution and a liquid catalyst (also known as sweetening catalyst) in an extractor column. In this step, caustic reacts with mercaptans to produce the sodium mercaptides. The sodium mercaptide is further sent to a regenerator column in which air is passed in presence of sweetening catalyst to convert the sodium mercaptide to disulfides and the aqueous caustic is regenerated and recycled back. In this process, a portion of the spent caustic as a purge stream is routed to effluent treatment plant.

Process Description

In the embodiment, the present invention provides a process for removal of sulfur and other impurities from mixed olefinic Liquefied Petroleum Gas. Mixed olefinic LPG streams comprising isobutene from various cracking processes of refinery/petrochemical units are routed to a reactor in a reaction zone, wherein the olefins present in the feedstock react with the organic sulfur present in the feedstock and form heavier sulfides. The olefin preferably isobutene reacts instantaneously with the feed sulfur components and forms respective heavier sulfides in the reaction zone. In the reaction zone, the olefins preferably $C_4$ olefins also react and form a liquid product comprising dimers, trimers, and tetramers, which in-turn react with sulfur compounds and form heavier sulfides. The formed dimer compounds react with the mercaptan and form its corresponding sulfide component. Oxygenate components are added to modify the catalyst acidity which in turn controls the conversion and selectivity of the dimerization reaction. The oxygenate component, the LPG, the heavier sulfides along with the liquid product comprising dimers, trimers and tetramers are separated in a fractionating column wherein the oxygenate component is separated as an intermediate cut and recycled back to the reactor and the heavier sulfides along with the liquid product is routed to any existing hydrodesulfurization unit in a refinery, a petrochemical complex or to a fluid catalytic cracking unit. The LPG with less than 10 ppmw sulfur referred to as treated LPG is routed from the top of the fractionating column to various units such as a propylene recovery unit, methyl tert-butyl ether unit, ethyl tert-butyl ether unit or a dimerization unit for further utilization depending upon the requirements.

According to FIG. 1, the feed $C_4$/LPG (1) is sent to the reaction zone (2) along with oxygenates. The reactor effluent is then sent to a fractionator column (5) where liquid product containing heavier sulfur compounds is drawn from the bottom (8) and the treated $C_4$/LPG is obtained from the top (6). An oxygenate rich side stream is drawn from the fractionator column (7) and recycled back to the reactor along with the makeup oxygenate stream (4).

Figure 2:
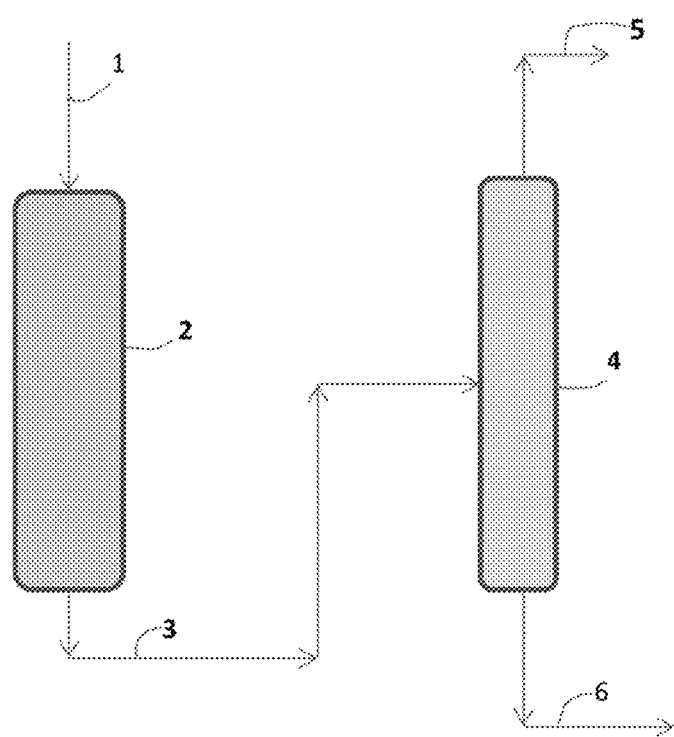
FIG. 2: is a diagrammatic representation of scheme 2 of the present invention.

According to FIG. 2, low active modified or spent cation exchange resin catalyst is used in the reactor (2) and the feed $C_4$ or LPG (1) is directly sent to the reaction zone (2). The reactor effluent (3) containing liquid product and heavier sulfur compounds along with $C_4$ or LPG is sent to a fractionator column (4). The liquid product along with the heavier sulfur compound is drawn from bottom of the column and the treated $C_4$/LPG is obtained from the top of the fractionator column.

| Process conditions | | |
| --- | --- | --- |
| Temperature | °C. | 65-95 |
| Pressure | kg/cm$^2$g | 16-20 |
| WHSV | hr$^{-1}$ | 5.0-10.0 |

Feedstock

In a preferred embodiment, the feedstock is a mixed olefin $C_4$ stream. According to a preferred feature of the present invention, the feedstock is a mixed olefinic LPG stream comprising isobutene in a range of 5-30 wt %. The LPG streams from any of the cracking units such as fluidized catalytic cracking, delayed coker, visbreaker, fluid coker, deep catalytic cracking, naphtha cracking units etc., are utilized.

According to another feature of the present invention, sulfur content of the feedstock is in a range of 30-900 ppmw.

Oxygenate Compound

In one embodiment, the oxygenate compound added to modify the catalyst acidity and to control the conversion and selectivity of dimerization reaction is an alcohol.

In one embodiment, the alcohol is selected from the group consisting of methanol, ethanol and tertbutyl alcohol. In a preferred embodiment, the alcohol is tert-butyl alcohol (TBA).

In one embodiment, the oxygenate/olefin mole ratio is in a range of 0.03-0.15.

Cation Exchange Resin Catalyst

In one embodiment, the cation exchange resin is a high active cation exchange resin, a modified low active cation exchange resin or a spent catalyst. In another embodiment, the cation exchange resin is a high active cation exchange resin having styrene-divinyl benzene in the backbone and sulfonic acid group in the active sites such as Amberlyst 15, Amberlyst 35, INDION 180, Tulsion® T62MP etc., modified low active cation exchange resin or spent catalyst having styrene-divinyl benzene in the backbone and sulfonic acid group in the active sites such as spent catalyst from dimerization units, phenol alkylation units, MTBE and TAME units etc. Composition and total exchange capacity of some of the catalyst are provided in below table:

| Cation exchange resin | Backbone | Active sites | Total exchange capacity, meq/dry gram of catalyst |
|---|---|---|---|
| Amberlyst 15 | Styrene-divinyl benzene copolymer | Sulfonic acid | ≤4.7 |
| Amberlyst 35 | Styrene-divinyl benzene copolymer | Sulfonic acid | ≥5.2 |
| INDION 180 | Styrene-divinyl benzene copolymer | Sulfonic acid | ≥5.0 |
| Tulsion® T62MP | Styrene-divinyl benzene copolymer | Sulfonic acid | ≥4.8 |

In one embodiment, the present invention provides a high active cation exchange resin catalyst for reaction. The conversion of olefins to liquid product is controlled by increasing the oxygenate concentration in the feed. It is observed that by increasing the oxygenate/isobutene concentration, the overall conversion of isobutene to dimer decreased, whereas the conversion of sulfur compounds to form heavier sulfides remains unchanged, which shows the reaction between isobutene and sulfur compounds such as mercaptans are instantaneous. The high active cation exchange resin has active sites concentration in a range of 4.7-5.2 eq/kg.

The active site concentration refers to the total exchange capacity of the ion exchange resin which is evaluated by the standard test method described in IS: 7330-1988 Section 6. Prior to the test, the resin sample is first calcined at 104±2° C. for 16±2 hours. One gram of calcined sample is kept for soaking in 0.1N NaOH solution prepared in 1N NaCl solution for 16-24 hours. The normality of the solution is depleted by the acid sites of the catalyst which is determined by titration with standard 0.1 N HCl solution.

In another embodiment of the present invention, a modified spent or low active cation exchange resin catalyst is used for the reaction section. When the low active cation exchange resin catalyst is used, addition of any oxygenate component is optional. It is found that with decrease in the concentration of active sites, the overall conversion of isobutene to dimer decreased. However, the conversion of sulfur compounds to form heavier sulfides remains unchanged, which shows that the reaction between isobutene and sulfur compounds such as mercaptans are instantaneous even with the very low active catalyst. The modified or spent cation exchange resin catalyst has active sites concentration in a range of 1-3.5 eq/kg.

In yet another embodiment, the modified low active ion exchange resin catalyst is prepared by treating a fresh catalyst with metal hydroxide solution of 0.1-0.5 normality at the rate of 10 milliliter per grams of catalyst. the metal hydroxide is sodium hydroxide or potassium hydroxide and is preferably sodium hydroxide. The modified ion exchange resin catalyst has reduced active sites concentration in a range of 1-3.5 eq/kg having changed ionic forms than the fresh catalyst which is the preferable range for the process of present invention.

In another embodiment as presented in scheme 2 (FIG. 2), the fresh catalyst system which has acidity in a range of 4.7-5.2 eq/kg has been modified by passing diluted metal hydroxide solution preferably NaOH through a pretreatment process on the catalyst. Upon exchange of metal ions, the acidity of the catalyst is reduced to 1-3.5 eq/kg. The reaction is same as that of explained above and the liquid product which comprises dimer, trimers, tetramers, heavier sulfide compounds, and treated LPG are separated in a fractionating column. The heavier sulfides along with the liquid product is routed to any existing hydrodesulfurization unit in the refinery or petrochemical complex. The treated LPG with less than 10 ppmw sulfur from the top of fractionating column is routed to various units for utilization depending upon the requirements.

Alternately, in another embodiment of the present invention, spent ion exchange resin catalyst disposed from various process units such as MTBE, ETBE, TAME, dimerization, etc., has been used as a desired catalyst for the process. Spent catalyst having active sites concentration in a range of 1-3.5 eq/kg, deposited impurities such as nitrogen, nitriles, etc., on the catalyst in a range of 0.5-2.5 wt % and metals such as iron, sodium, and calcium, etc., in a range of 1000-3000 ppmw is used in the process as an alternate to fresh or modified catalyst.

In yet another embodiment of the present invention other impurities such as nitrogenous compounds, nitriles, and metals are removed simultaneously in the reaction zone by adsorption or exchange of ions with catalyst.

Another embodiment of the present invention provides a process with lowest per pass conversion of isobutene to dimer whereas the sulfur interaction with isobutene increases or remains constant, which provides the pure LPG/$C_4$ stream with low sulfur and impurities.

ADVANTAGES OF THE PRESENT INVENTION

The following are the technical advantages of the present invention over the prior art:
  Removal of sulfur and other impurities from olefinic Liquefied Petroleum Gas (LPG) comprising olefins through reactive desulfurization route.
  The advantage of the present invention is production of organic sulfur free LPG stream having sulfur content lower than 10 ppmw, which will be used as a feedstock for downstream and other petrochemical processes.

Another advantage is the minimization or elimination of significant generation of caustic waste from LPG treatment unit.

Yet another advantage of the present invention is using the spent catalyst system for reactive desulfurization zone due to which landfill operation is minimized.

One advantage of the present invention is that the removal of other impurities such as basic nitrogen, nitriles, and metals from the LPG stream.

Another advantage of the present invention is that the process consumes minimal isobutene and other butenes for reactive desulfurization.

Yet another advantage of the present invention is that the acidity of fresh catalyst is controlled through metal modification and through additive approach.

Another advantage of the present invention is that the sulfur concentrated liquid product is routed to existing hydrodesulfurization unit and the desulfurized liquid product is used as gasoline blend stock having high RON in a range of 95-98.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods, the exemplary methods, devices and materials are described herein. It is to be understood that this disclosure is not limited to particular methods, and experimental conditions described, as such methods and conditions may vary.

Composition of the feed used for the following examples are provided in the Table 1.

TABLE 1

Feed Composition

| Components | Composition, vol % |
|---|---|
| I-Butane | 27.75 |
| n-Butane | 9.35 |
| Iso-Butene | 17.13 |
| Trans-2-Butene | 15.5 |
| Cis-2- Butene | 13.91 |
| I-Butene | 13.92 |
| 1,3 Butadiene | 0.15 |
| Propane | 0.04 |
| Propylene | 0.01 |
| I-pentane | 0.9 |
| n-pentane | 0.01 |
| $C_6+$ | 0.73 |

Example 1

This example shows the effect of TBA concentration in the feed on the conversion of $C_4$ to higher boiling liquid products. The feed has sulfur impurity concentration of 38 ppmw.

TABLE 2

Effect of TBA concentration on conversion of $C_4$

| Run No. | TBA/ isobutene in feed, mol/mol | Temperature, °C. | Pressure, Bar | Yield of liquid product, wt % | % of feed sulfur in Product | Liquid Product sulfur, ppmw | Product gas sulfur, ppmw |
|---|---|---|---|---|---|---|---|
| 1 | 0.014 | 81 | 14.5 | 28 | 87 | 98 | 3 |
| 2 | 0.031 | 73 | 14.5 | 21 | 70 | 107 | 4 |
| 3 | 0.062 | 71 | 14.5 | 16 | 84 | 156 | 4 |
| 4 | 0.094 | 70 | 14.5 | 8 | 83 | 285 | 4 |
| 5 | 0.123 | 70 | 14.5 | 3 | 94 | 810 | 4 |
| 6 | 0.16 | 60 | 14.5 | No liquid product obtained | — | — | Same as feed |

The experiments are conducted with various TBA concentrations in the feed at constant feed inlet temperature and pressure. It is observed that with the increase in concentration of TBA the yield of liquid product which comprises dimer, trimer, and tetramer of $C_4$ olefins decreases drastically. However, the percentage of feed sulfur in the product does not change significantly, which shows that the feed sulfur interaction with $C_4$ Olefins is instantaneous. Moreover, in every case it has been observed that the product gas sulfur remains below 4 ppmw.

Example 2

In this example, low active modified ion exchange resin catalyst has-been prepared by doping catalysts with various nitrogenous compounds such as mono-ethanolamine (MEA) and methyl diethanolamine (MDEA) in a range of 3-5 wt %. Although the modified catalyst system has a total exchange capacity of 1-3.5 meq/gm, the catalysts have shown no reactivity in the reaction system and no liquid product is generated. Hence, separation of sulfur compound could not be possible.

Example 3

In this example, modified low active ion exchange resin catalyst has been prepared by treating with 0.1-0.5N NaOH solution. The concentration of diluted NaOH solution is calculated from the concentration of active sites of fresh catalyst and desired concentration of active sites of modified catalyst. For modifying the catalyst, 100 gms of fresh catalyst having total exchange capacity of >5.2 meq/gms was packed in a glass column and one litre of diluted NaOH solution of concentration as mentioned in table below (Table-3) is then passed through the catalyst bed at the rate of 20-25 ml/min. After the treatment with NaOH solution, the catalyst was removed from the column and was dried at 104±2° C. for 16±2 hrs. This example shows the effect of NaOH concentration on the concentration of active sites of the catalyst. Table 3 demonstrates use of low active cation exchange resin catalyst which has active sites concentration in a range of 1-3.5.5 eg/kg.

TABLE 3

Effect of NaOH concentration on the concentration of active sites of the catalyst

| Normality of NaOH solution used | Concentration of active sites, meq/gm | Product yield, % | % of feed sulfur in product | Total sulfur of treated C4, ppmw |
|---|---|---|---|---|
| Fresh catalyst | >5.2 | 30.2 | 69.3 | 16.7 |
| 0.05 | 4.80 | 25.2 | 93.5 | 2.8 |
| 0.10 | 4.39 | 20.1 | 89.7 | 4.9 |
| 0.15 | 3.98 | 17.9 | 89.3 | 5.0 |
| 0.20 | 3.51 | 15.0 | 90.6 | 4.2 |
| 0.30 | 2.94 | 12.2 | 90.9 | 3.9 |
| 0.40 | 1.68 | 9.7 | 93.6 | 2.7 |
| 0.50 | 1.17 | 5.7 | 94.8 | 2.1 |
| 0.60 | 0.70 | No liquid product obtained | — | Same as feed |

The experiments are conducted with the catalyst of different acid capacities using the feed mentioned in Table 1. It is observed that as the acid capacity of the catalyst decreases, the conversion of the $C_4$ components decreases due to the loss of the activity of the catalyst. The above data shows the percentage of the feed sulfur in the liquid product. It can be seen from the above example that the conversion of sulfur compounds remains constant although the conversion of the main reaction is decreased. It is surprisingly seen that more than 90% of the feed sulfur is converted and lands up in the liquid product with decreasing activity. The catalyst activity can be modified in different ways. The catalyst in which activity has been modified by metal exchange are found active for the desired reactions while the catalyst in which activity is modified using amines as mentioned in example 2 have shown no activity although the activity in terms of total exchange capacity of the modified catalyst in both the cases are same. This is a surprising effect. Similar experiments conducted as mentioned in Example 2 with different amines do not shown any conversion or initiation of reaction. This shows that the acidity modification method plays a significant role in getting the desired results.

Example 4

This example shows the effect of feed sulfur concentration on the yield of product and catalyst deactivation due to high sulfur concentration of the feed. The experiments were conducted using modified catalyst with concentration of active sites of 3.5 meq/gm prepared using the method described in Example 3. The same feed with sulfur impurities concentration of 38 ppmw as described above (Example 1) has been used in this example. In order to study the effect of sulfur on catalyst performance, the sulfur concentration has been spiked by doping pure ethyl mercaptan. Experiments were conducted with different feed having different sulfur concentrations. It is observed that beyond the feed sulfur concentration of 900 ppmw, yield of liquid product reduced due to catalyst deactivation.

TABLE 4

Effect of feed sulfur concentration on the yield of product

| Feed sulfur, ppmw | Yield of liquid product, wt % | % of feed sulfur in Product | Product Sulfur, ppmw |
|---|---|---|---|
| 134 | 16.5 | 81.1 | 907 |
| 196 | 15.5 | 80.7 | 825 |
| 300 | 15.3 | 73.0 | 1155 |
| 600 | 14.8 | 80.0 | 2910 |
| 680 | 14.7 | 81.8 | 3620 |
| 704 | 14.3 | 82.1 | 4475 |
| 895 | 8.2 | 90.9 | 10000 |
| 940 | 6.6 | 94.1 | 13500 |

Example 5

This example shows the effect of spent ion exchange resin catalyst system from a commercial process unit.

TABLE 5

Effect of spent ion exchange resin catalyst

| Spent catalyst Properties | Product yield, % | % of feed sulfur in product |
|---|---|---|
| Spent catalyst having a total exchange capacity of 2.24 meq/gm with nitrogen deposition of 1.6% and metal deposition of 2653 ppm in form of iron, calcium, and sodium | 8.3 | 88.6 |

TABLE 6

| Feed Sulfur, ppmw | Treated $C_4$ Sulfur, ppmw |
|---|---|
| 279 | 10 |
| 169 | 10 |
| 112 | 7 |
| 98 | 9 |

This example shows the effect of varying feed sulfur concentration vs. product sulfur concentrations. Spent catalyst having a total exchange capacity of 2.24 meq/gm with nitrogen deposition of 1.6% and metal deposition of 2653 ppm in form of iron, calcium, and sodium has been used for the conversion of lighter sulfur compounds to heavier compounds an d olefin s to liquid product. The reactions were carried out at the temperature of 80° C. and pressure of 14.5 bar. Treated C4 was separated from liquid product in a flash drum. Although the feed sulfur varied in a wide range from 98 ppmw to 279 ppmw, the sulfur concentration in the desulfurized $C_4$ stream is found to be below 10 ppmw.

The spent catalyst with more than 3.0 meq/gm of total exchange capacity is not considered as a spent catalyst and the spent catalyst with less than 1.0 meq/gm has no usable remaining active site concentrations.

Example 6

This example shows the effect of change in feed matrix.

TABLE 7

| Components | Composition, vol % |
|---|---|
| Ethane | 0.63 |
| Ethylene | 0.05 |

TABLE 7-continued

| Components | Composition, vol % |
|---|---|
| Propane | 5.45 |
| Propylene | 20.37 |
| I-Butane | 19.97 |
| N-Butane | 6.58 |
| Butene-1 | 8.37 |
| I-Butylene | 14.45 |
| Trans-2-Butene | 11.51 |
| Cis-2-Butene | 9.41 |
| 1,3 butadiene | 0.15 |
| I-Pentane | 1.61 |
| Nitrogen | 0.64 |
| C6+ | 0.73 |
| Total | 99.92 |

TABLE 8

| Run No. | TBA/ isobutene in feed, mol/mol | Temperature, °C. | Pressure, Bar | Yield of liquid product, wt % | % of feed sulfur in product | Liquid Product sulfur, ppmw | Product gas sulfur, ppmw |
|---|---|---|---|---|---|---|---|
| 1 | 0.015 | 80 | 14.5 | 25 | 94 | 198 | 5 |
| 2 | 0.059 | 72 | 14.5 | 15 | 88 | 305 | 8 |
| 3 | 0.101 | 68 | 14.5 | 5 | 85 | 907 | 9 |
| 4 | 0.133 | 65 | 14.5 | 2 | 76 | 1975 | 14 |

Experiments were conducted using the process outlined in Example 1 and the feed being the above mentioned LPG feed (Table 7) having sulfur impurity concentration of 56 ppmw. The experiments were conducted with various TBA concentrations in the feed at constant feed inlet temperature and pressure. Like the $C_4$ feed (Table 1), the yield of liquid product was found to have decreased and concentration of sulfur compounds in the liquid product was found to have increased with TBA to isobutene molar ratio. In most of the cases, the treated LPG sulfur were below 10 ppmw.

Example 7

This example demonstrates the sulfur species present in the liquid product. The major sulfur species of the liquid products were analyzed through GC-SCD and GC-MS and presented below. No mercaptans are observed in the liquid product as the mercaptans are completely converted to heavier sulfides in the process.

TABLE 9

| Sr. No. | Sulfur compounds in product |
|---|---|
| 1. | Dimethyl sulphide |
| 2. | Dimethyl Disulphide |
| 3. | Diethyl Disulphide |
| 4. | Methyl propyl Disulphide |
| 5. | t-butyl methyl sulfide |
| 6. | t-butyl ethyl sulfide |
| 7. | Propyl tert-butyl sulfide |
| 8. | Butyl tert-butyl sulfide |
| 9. | ethyl trimethylpentane sulfide |
| 10. | sec- butyl ethyl sulfide |
| 11. | isomers of $C_{10}H_{22}S$ |
| 12. | Octyl ethyl sulfide |

Example 8

The table provided below depicts the technical advancement of the claimed process over a conventional process commonly employed for removal of sulfur and other impurities from olefinic LPG. This conventional process is a two-stage caustic wash process for the removal of mercaptan impurities. After the caustic wash, the LPG stream has to be washed with water also, which in turn generates water as effluent. In this process, significant amount of caustic residue is generated which often creates several environmental issues.

TABLE 10

| Process | Feed sulfur | Product yield, % | % of sulfur in treated LPG feed | Caustic consumptions per tons of feed, Litre |
|---|---|---|---|---|
| Process of present invention | 30-900 ppmw | 3-10% | 5-20% | NIL |
| Conventional process | 30-300 ppmw | NIL | 10-30% | 250-400 |

The invention claimed is:

1. A process for removal of sulfur and other impurities from a mixed olefinic Liquefied Petroleum Gas (LPG) stream, the process comprising:
   (a) feeding the mixed olefinic LPG stream along with an oxygenate component to a reactor comprising a cation exchange resin catalyst,
      wherein olefins present in the mixed olefinic LPG stream react with the sulfur present in mercaptan impurities to form alkyl sulfides and dialkyl sulfides;
      wherein the olefins present in the mixed olefinic LPG stream react to form a liquid product comprising dimers, trimers, and tetramers; and
      wherein the liquid product reacts with the sulfur present in mercaptan impurities and form alkyl sulfides and dialkyl sulfides;
   (b) subjecting the oxygenate component, the alkyl sulfides and dialkyl sulfides along with the liquid product and a treated LPG stream to separation in a fractionating column, wherein the oxygenate component is separated and recycled back to the reactor along with a makeup oxygenate stream;
   (c) sending the alkyl sulfides and alkyl disulfides along with the liquid product from the fractionating column to a hydrodesulfurization unit in a refinery, a petrochemical complex or to a fluid catalytic cracking unit; and
   (d) routing the treated LPG stream from top of the fractionating column for further utilization,
      wherein the sulfur content is reduced from 30-900 ppmw in the mixed olefinic LPG stream to 3-10 ppmw in the treated LPG stream.

2. The process as claimed in claim 1, wherein the cation exchange resin catalyst is a high active cation exchange resin catalyst, a modified low active cation exchange resin catalyst or a spent catalyst.

3. The process as claimed in claim 2, wherein the high active cation exchange resin catalyst has active site concentration in a range of 4.7-5.2 eq/kg.

4. The process as claimed in claim 2, wherein the oxygenate component is added when the high active cation exchange resin catalyst is used.

5. The process as claimed in claim 2, wherein the modified low active cation exchange resin catalyst is prepared by treating a fresh catalyst with a metal hydroxide solution at a rate of 10 milliliter per gram of catalyst.

6. The process as claimed in claim 5, wherein the metal hydroxide is sodium hydroxide or potassium hydroxide.

7. The process as claimed in claim 6, wherein concentration of the metal hydroxide is in a range of 0.1-0.5 N.

8. The process as claimed in claim 5, wherein the modified low active cation exchange resin catalyst has active site concentration in a range of 1-3.5 eq/kg.

9. The process as claimed in claim 2, wherein the spent catalyst has active site concentration in a range of 1-3.5 eq/kg, deposited impurities in a range of 0.5-2.5 wt. % and metals in a range of 1000-3000 ppmw.

10. The process as claimed in claim 1, wherein the treated LPG is routed to a propylene recovery unit, a methyl tert-butyl ether unit, an ethyl tert-butyl ether unit, or a dimerization unit.

11. The process as claimed in claim 1, wherein the oxygenate component is an alcohol.

12. The process as claimed in claim 11, wherein the alcohol is selected from the group consisting of methanol, ethanol, and tertbutyl alcohol.

13. The process as claimed in claim 1, wherein the oxygenate/olefin concentration is in a mole ratio of 0.03-0.15.

14. The process as claimed in claim 1, wherein the mixed olefinic LPG stream comprises C4 olefins.

\* \* \* \* \*